Sept. 8, 1970     P. C. KESLING     3,526,961
BUCCAL TUBE ASSEMBLY
Filed May 12, 1969     2 Sheets-Sheet 1
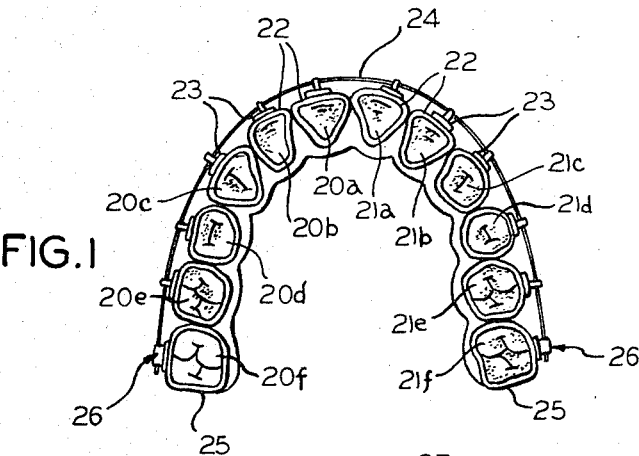
FIG.1
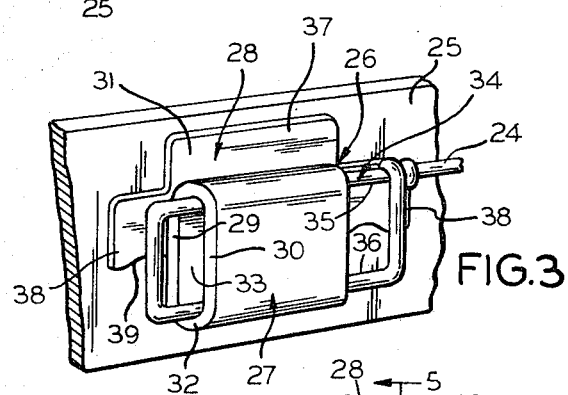
FIG.3
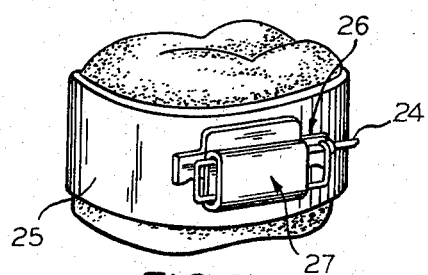
FIG.2
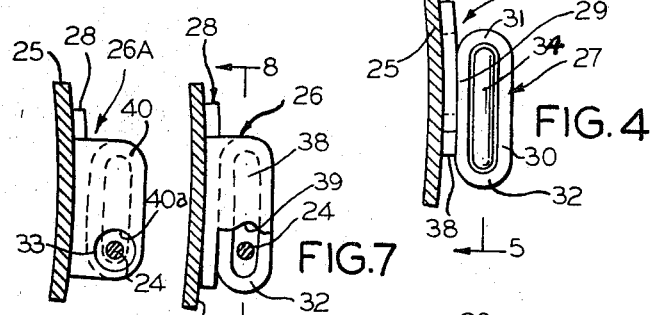
FIG.4    FIG.7    FIG.9
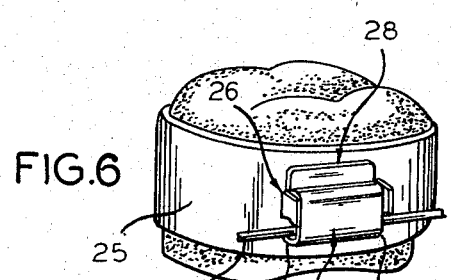
FIG.6
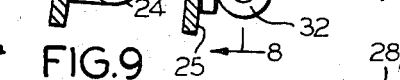
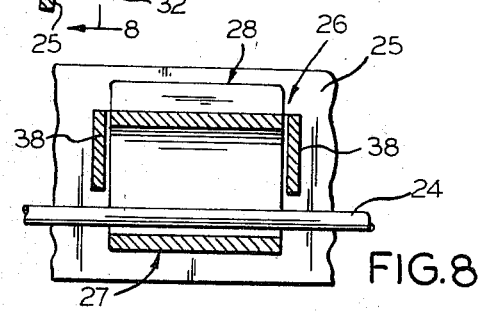
FIG.8
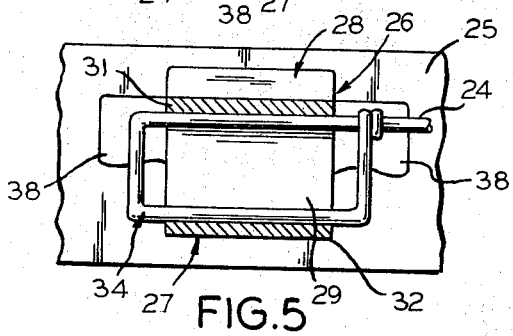
FIG.5
INVENTOR
PETER C. KESLING
BY
*Kinzer, Dorn & Zickert*
ATTORNEYS Sept. 8, 1970 P. C. KESLING 3,526,961
BUCCAL TUBE ASSEMBLY
Filed May 12, 1969 2 Sheets-Sheet 2
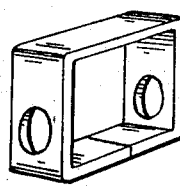
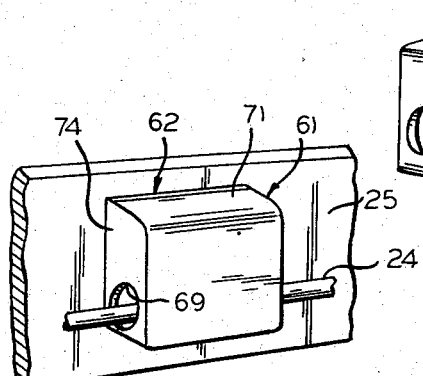
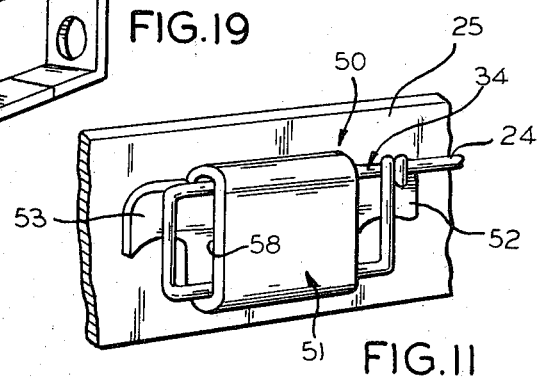
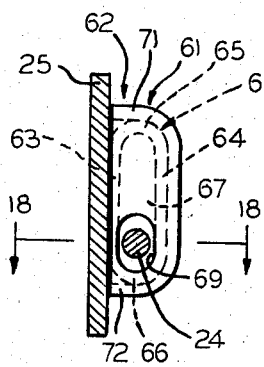
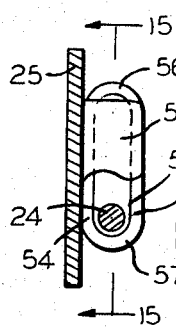
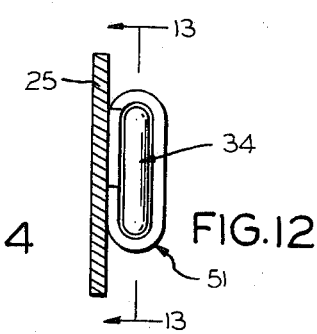
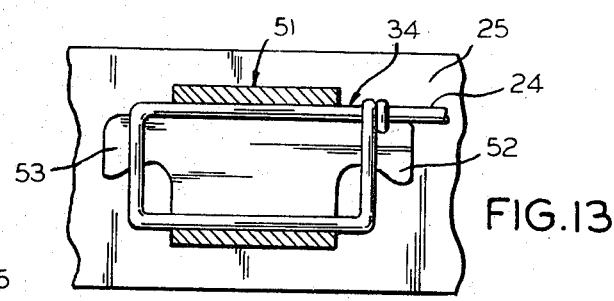
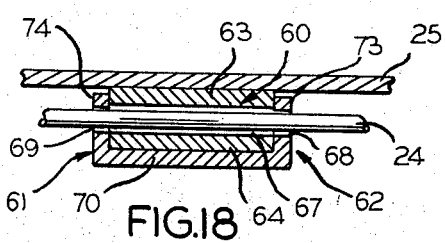
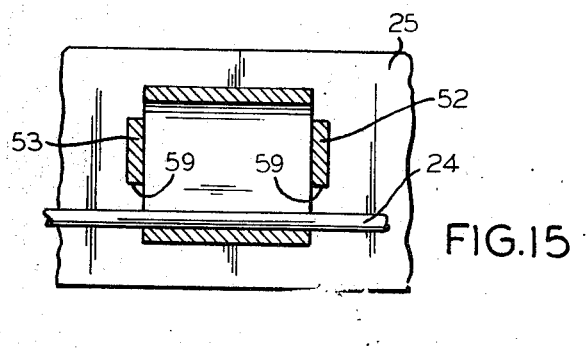
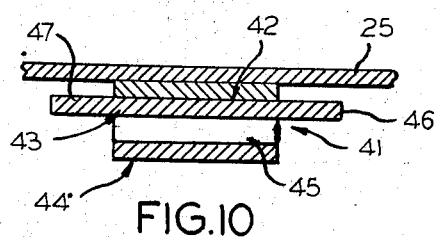
INVENTOR
PETER C. KESLING
BY
Kinzer, Dorn & Zickert
ATTORNEYS

United States Patent Office 3,526,961
Patented Sept. 8, 1970

3,526,961
BUCCAL TUBE ASSEMBLY
Peter C. Kesling, Green Acres, La Porte, Ind. 46350
Filed May 12, 1969, Ser. No. 823,735
Int. Cl. A61c 7/00
U.S. Cl. 32—14                                    14 Claims

ABSTRACT OF THE DISCLOSURE

Buccal tube assembly adapted to be mounted on a tooth for receiving the distal end of an arch wire and capable of selectively providing an oval opening for receiving a doubled back portion of an arch wire to obtain movement control of the tooth, or a generally cylindrical opening to receive a single arch wire to anchor the distal end thereof, wherein the assembly may be converted while in the patient's mouth.

---

This invention relates in general to an orthodontic appliance, and more particularly to an orthodontic appliance for receiving the distal end of an arch wire, and still more particularly to a buccal tube assembly capable of selectively receiving a doubled back or single arch wire in different stages of treatment.

Heretofore, the use of a buccal tube on an anchor tooth for receiving the distal end of the arch wire in one form has been well known. It is common that the distal end of the arch wire may be in doubled back form during one stage of treatment, to obtain torquing and rotation while the distal end may be in single or regular form during other stages of treatment for merely anchoring of same. For example, an oval buccal tube is generally used in the earlier stages to receive the distal ends of the arch wire in doubled back form. Thereafter, in subsequent stages of treatment it is common that the distal ends of the arch wire merely need to be anchored and then a cylindrical buccal tube is employed to receive the arch wire in single form. To accomplish conversion from one stage to another, the original oval shaped buccal tube is removed with the band that holds the same on the tooth. Thereafter, either a new band with another buccal tube having a generally cylindrical shape is applied to the tooth, or such a tube is suitably soldered onto the band that was removed following removal of the oval tube from that band. In either case, it is necessary to remove the oval shaped buccal tube and replace it with another tube, in order to proceed from one type of wire to another.

The present invention eliminates the necessity of substituting buccal tubes, which is time consuming and costly, by providing a convertible buccal tube assembly. This assembly in one form includes an oval tubular member, and end ears or tabs at the opposite ends that can be bent thereover to effectively close the opening through the tube. The end ears may be integral with the oval tubular member or provided on a mounting pad thereunder. Holes or cutouts are provided in the tabs which align with the tube opening and receive the arc wire in single form. Alternately, the end ears may be shaped so that upon being bent over the ends of the oval tubular member they coact with the opening to define generally cylindrical buccal tube openings. Accordingly, a simple adjustment of the buccal tube assembly while in the patient's mouth can permit quick conversion when necessary without removing the assembly. In another form, a cap or cover member may be provided to coact with a standard oval buccal tube to convert same for receiving single form arch wire.

It is therefore an object of the present invention to provide a new and improved buccal tube assembly for use in orthodontic treatment, that can be converted to receive the distal ends of an arch wire either in doubled back or single form.

Another object of this invention is the provision of a buccal tube assembly including an oval shaped tubular member and end ears or tabs at the mesial and distal ends selectively bendable over the mesial and distal ends of the tube to coact therewith and define arch wire receiving end openings having an occlusal-gingival dimension substantially smaller than that of the opening defined by the oval shaped tubular member.

A further object of this invention resides in the provision of a buccal tube assembly including an oval shaped tubular member and tabs at the opposite ends of the member with wire receiving holes therein, wherein the tabs may be bent from an inoperative to an operative position to selectively permit the assembly to receive the wire in doubled back or single form.

A still further object of this invention is in the provision of a buccal tube assembly including a conventional oval shaped buccal tube and a cap that may be placed thereon to convert the assembly to receive an arch wire in single form, wherein holes are provided in the cap that align with the opening of the buccal tube.

Other objects, features and advantages of the invention will be apparent from the following detailed disclosure, taken in conjunction with the accompanying sheets of drawing, wherein like reference numerals refer to like parts, in which:

FIG. 1 is a plan view of an arch of a person, wherein brackets and an arch wire are illustrated in position on the teeth, and wherein buccal tube assemblies according to the invention are illustrated on the anchor teeth;

FIG. 2 is a perspective fragmentary view of a tooth having one form of a buccal tube assembly according to the invention mounted thereon, wherein the end ears extend from a mounting pad, and illustrating a doubled back arch wire received in the oval buccal tube;

FIG. 3 is an enlarged perspective view of the buccal tube assembly as mounted on a band and according to the arrangement shown in FIG. 2;

FIG. 4 is a distal end elevational view of the buccal tube assembly of FIG. 3;

FIG. 5 is a sectional view taken substantially along line 5—5 of FIG. 4;

FIG. 6 is a perspective view of the buccal tube assembly according to the invention and differing from FIG. 2 in that the end ears or tabs are bent over the opposite open ends of the buccal tube in order to freely receive the arch wire in its regular single form;

FIG. 7 is a distal end elevational view of the arrangement of FIG. 6;

FIG. 8 is a sectional view taken substantially along line 8—8 of FIG. 7;

FIG. 9 is a distal end elevational view like FIG. 7, but showing a modification where holes are formed in the end ears;

FIG. 10 is a horizontal sectional view taken through a further modification of the invention, wherein the end ears or tabs are integral with the buccal tube portion;

FIG. 11 is a perspective view of a still further modified buccal tube assembly according to the present invention, and illustrating the assembly as receiving a doubled back arch wire;

FIG. 12 is a distal end elevational view of the embodiment of FIG. 11;

FIG. 13 is a sectional view taken substantially along line 13—13 of FIG. 12;

FIG. 14 is an end elevational view similar to the view of FIG. 12, but illustrating the end ears or tabs bent over the opposite ends of the buccal tube in order to define a restricted opening for receiving the free end of a single arch wire;

FIG. 15 is a sectional view taken substantially along line 15—15 of FIG. 14;

FIG. 16 is a perspective view of a still further modification of the present invention, wherein a standard oval buccal tube is employed and a cap or cover is mounted thereover to define the restricted opening of the buccal tube for receiving the single free end of an arch wire;

FIG. 17 is an end elevational view of the embodiment of FIG. 16, and illustrating parts in dotted lines for purposes of clarity;

FIG. 18 is a horizontal sectional view taken substantially along line 18—18 of FIG. 17; and FIG. 19 is a perspective view of a further embodiment illustrating another form of cap or cover to be used with a standard buccal tube.

Referring now to the drawings, FIG. 1 illustrates an arch of a person having teeth 20a, 20b, 20c, 20d, 20e and 20f on one side and teeth 21a, 21b, 21c, 21d, 21e and 21f on the other side. The teeth 20a to 20e and 21a to 21e includes bands 22 having mounted thereon brackets 23 of any desired type for receiving an arch wire 24. Teeth 20f and 21f are considered anchor teeth and include bands 25 mounted thereon and a buccal tube assembly 26 secured to the bands for receiving the opposite free ends of the arch wire 24. It is the buccal tube assemblies 26 that constitute the invention in this application.

The buccal tube assembly 26 illustrated in FIGS. 2 to 8 includes an oval buccal tube 27 of conventional construction, and a mounting pad 28 upon which the buccal tube is mounted and which coacts therewith as will be hereinafter described to constitute one form of the buccal tube assembly of the present invention.

The conventional oval buccal tube 27 includes lingual and buccal walls 29 and 30 arranged in substantially parallel relation, and occlusal and gingival walls 31 and 32 interconnecting the lingual and buccal walls. An arch wire receiving opening 33, oval in shape, is defined by the walls. During the earlier stages of treatment and occasionally later stages, the oval opening is preferred so that it can receive the arch wire in doubled back form as indicated at 34, as bent at the free ends of the arch wire 24 to essentially fill the arch wire receiving opening 33 of the buccal tube 27, thereby obtaining desired torqueing and/or rotation of an anchor tooth. As seen in FIG. 3, the doubled back end 34 of the arch wire includes the upper and lower wire segments 35 and 36 that essentially bear tightly or snugly against the occlusal and gingival walls 31 and 32 of the buccal tube. The doubled back form 34 is essentially a loop at the free ends of the arch wire and formed to obtain movement control of the anchor teeth.

The mounting pad 28 of the buccal tube assembly 26 is normally secured to the buccal tube 27, by welding or soldering, and then mounted on the band 25 by suitable welding or soldering, thereby attaching the buccal tube 27 to the band and ultimately to the anchor tooth. The mounting pad includes a main body portion that lies between the band and the lingual wall 29 of the buccal tube and of substantially the same dimension, a band mounting extension 37 that extends occlusally of the buccal tube to enable mounting of the assembly onto a band, and opposed mesially and distally extending end ears or tabs that are in alignment with the mesial-distal axis of the buccal tube 27. A band mounting extension may be alternately provided extending gingivally of the buccal tube, or extensions may be provided at both gingival and occlusal sides of the tube. The ears extend mesially and distally from the opposite ends of the buccal tube sufficiently so that when bent over the opposite ends of the buccal tube as illustrated particularly in FIGS. 6, 7 and 8, the then buccal edges of the end ears will be substantially flush with the buccal surface of the tube.

The end ears 38 in the embodiment of FIGS. 2–8 are formed so that when they are bent over the ends of the buccal tube, they coact with the end openings to substantially reduce the size of the end openings and render the buccal tube assembly in condition for handling arch wire in single form, as seen in FIGS. 6, 7 and 8. Each end ear 38 terminates gingivally short of the gingival end wall 32 of the buccal tube so that the arch wire 24 in single form may readily any easily extend through the tube below the end ears. The gingival edge 39 may be shaped in any desired form, but preferably is concavely formed at the portion which crosses the buccal tube end opening so that it is more compatible with the round arch wire.

Following the stage of treatment where the oval opening of the buccal tube is used, as shown in FIGS. 2 to 5, when advancing to a subsequent stage of treatment where it is only desired to use the buccal tube assembly for anchoring distal ends of the wire in single form, the end ears are bent into position as shown in FIGS. 6 to 8 to receive the distal end of the single arch wire 24 as shown. Accordingly, conditioning of the buccal tube assembly 26 according to the present invention permits advance from one stage of treatment to another stage of treatment where a different handling of the arch wire is desired without necessitating removal of the oval buccal tube and replacement thereof with a cylindrical buccal tube as has been heretofore required. It is only necessary that the orthodontist bend over the end ears 38 and condition the buccal tube assembly 26 for use to receive the free end of the arch wire in an equivalent nature to the use of the heretofore well known cylindrical buccal tube.

A modified buccal tube assembly 26A is illustrated in FIG. 9 which differs from the embodiment of FIGS. 2 to 8 only in the form of the end ears 40 which extend from the main body portion of the mounting pad 28. In this embodiment, the end ears when bent over the ends of the oval buccal tube substantially completely cover the buccal tube ends. Each end ear 40 is provided with a hole 40a that aligns with the buccal tube opening 33 and which coacts with the buccal tube opening to substantially decrease the occlusal-gingival dimension of the opening so that the buccal tube assembly is properly conditioned to receive arch wire in single form. The bottom edge of the hole 40a as viewed in FIG. 9 is substantially coplanar with the bottom edge of the buccal tube opening. Such enables the easy insertion of the arch wire in the buccal tube assembly when the end ears are bent over the buccal tube. This arrangement substantially conditions the buccal tube assembly to be equivalent to a cylindrical buccal tube, without necessitating the removal of the assembly from the patient's mouth. While the hole 40a in the end ear 40 is illustrated in location at the gingival end of the buccal tube, it should be appreciated that the hole may be positioned in the end ear at any place in alignment along the opening of the buccal tube.

In the event it is desired the mounting pad 28 be in spaced relation to the band 25, it can be appreciated that a conventional buccal tube mounting pad may be arranged between the mounting pad 28 and the band, which would be secured to the band and have the mounting pad 28 secured thereto. Such might in some instances facilitate the accessibility of the end ears 38 in that they would be in slightly spaced relation from the band.

Another embodiment of the invention is shown in FIG. 10, wherein the buccal tube assembly, generally indicated by the numeral 41 is one piece, and mounted on a conventional mounting pad 42 that is in turn mounted on the band 25. The buccal tube assembly 41 includes a buccal tube portion having opposed lingual and buccal walls 43 and 44, and the usual gingival and occlusal walls joining the opposite ends of the lingual and buccal walls, together defining an arch wire opening 45. End ears or tabs 46 and 47 are integral with the lingual wall 43 and may take the form shown in FIGS. 2–8, or FIG. 9. As shown in FIG. 9, the end ears 46 and 47 are in the open position to allow full use of the arch wire opening 45, and may be bent over the opposite open ends of the arch wire opening to bring into alignment therewith the arch wire holes 48 and 49. Thus, in the open position, the buccal tube assembly 41 is capable of receiving the arch wire in doubled back form, while in closed position where the end ears are bent over the ends of the tube, the assembly is in condition to receive single arch wire. It can therefore be appreciated that this embodiment differs from the embodiment of FIGS. 2 to 8 only in that the end ears 46 and 47 are integrally formed with the lingual wall 43 of the buccal tube portion.

It should be appreciated that there are many possible buccal tube assembly forms that come within the scope of the invention, and another modification is illustrated in FIGS. 11 to 15, wherein the buccal tube assembly is generally indicated by the numeral 50. This form is similar to the form shown in FIG. 10 in that it includes a buccal tube portion 51 having mesially and distally extending end ears or tabs 52 and 53 integral with the buccal tube portion. It can be seen that the buccal tube assembly 50 is mounted directly to the band 25, although a mounting pad could be arranged between the buccal tube assembly and the band in a similar fashion as shown in the embodiment of FIG. 10. The use of an additional mounting pad is strictly optional and will depend upon the desires of the orthodontist.

The buccal tube portion 51 includes opposed lingual and buccal walls 54 and 55 interconnected at opposite ends by occlusal and gingival walls 56 and 57. The end ears 52 and 53 are integral with the lingual wall 54. The gingival-occlusal dimension of the end ears 52 and 53 is such that when the end ears are bent over the ends of the buccal tube portion and define at opposite ends of the tube portion arch wire receiving holes 59 having an occlusal-gingival dimension substantially less than that of the arch wire opening 58 defined by the buccal tube portion 51. In this respect the end ears are the same as the end ears 38 on the mounting pad 28 in the embodiment of FIGS. 2–8.

Accordingly, as seen in FIGS. 11 to 13, when the end ears 52 and 53 are in extended position mesially and distally relative to the buccal tube portion, the arch wire opening 58 can receive a doubled back portion 34 of the arch wire 24. Thereafter, when it is desired that the buccal tube assembly 40 retain the arch wire in single form, it is only necessary to bend the end ears 52 and 53 over the open ends of the buccal tube portion 51 in the fashion shown in FIGS. 14 and 15 to coact with the ends of the buccal tube portion and define the arch wire receiving holes 59 for the arch wire free end 24. It should be appreciated that while the arch wire holes 59 are illustrated as being at the gingival side of the buccal tube portion 51, they may be arranged at the occlusal side by constructing the end ears so that the arch wire holes are defined at the occlusal end of the buccal tube portion.

A still further embodiment of the invention is illustrated in FIGS. 16 to 18, wherein a conventional oval shaped buccal tube 60 is suitably secured to a band to be used in the first instance for receiving a doubled back portion of an arch wire, and thereafter converted for use to receive a single arch wire by applying over the buccal tube a cover member 61. In this embodiment, the standard oval tube 60, and the cover member 61 constitute the buccal tube assembly 62 according to the invention.

As seen particularly in FIG. 17, the conventional buccal tube 60 includes opposed lingual and buccal walls 63 and 64 interconnected at opposite ends by occlusal and gingival walls 65 and 66 to thereby define an oval shaped arch wire opening 67 extending mesial-distally therethrough. The buccal tube 60 may be mounted directly on the band as illustrated or first mounted on a mounting pad, which is in turn mounted on the band as heretofore referred to and as shown in the embodiment of FIG. 10.

Further, it can be appreciated that the oval shaped buccal tube 60 would be employed in the early stages of treatment for receiving a doubled back portion of an arch wire where movement control of the anchor tooth is desired.

Conversion of the buccal tube assembly for use in receiving a single end arch wire merely comprises the application of the cover member 61 over the buccal tube 60 and insertion of the single end arch wire 24 through the arch wire holes 68 and 69 while also passing the wire through the arch wire opening 67 of the buccal tube 60. The cover member 61 includes a buccal wall 70 that bears against the buccal wall 64 of the buccal tube when in position, occlusal and gingival walls 71 and 72 of the cover bear against the occlusal and gingival of the buccal tube 60, and mesial and distal walls 73 and 74 that fit over the mesial and distal ends of the buccal tube 60. The mesial and distal walls 73 and 74 also extend perpendicular to the buccal wall 70. The cover member 61 is essentially a box-shaped member open at one side so that it can fit over the buccal tube 60. When the cover member 61 is in a working position and the arch wire 24 is inserted through the arch wire holes of the cover member and the arch wire opening of the buccal tube, the cover member is locked in place. While the arch wire holes 68 and 69 are illustrated adjacent to the gingival end of the buccal tube, and in that position the bottom of the holes will be flush with the bottom of the tube opening, it should be appreciated that they may be arranged anywhere along the arch wire opening 67 and in alignment therewith.

A cap or cover 80, FIG. 19, may be substituted for the cap or cover 61 of FIGS. 16–18. This cap differs primarily in that the buccal wall is eliminated, but otherwise it will perform the same conversion step and will be used with the conventional buccal tube.

Although the invention has been primarily described for conversion of a buccal tube assembly from the condition for receiving a doubled back portion of an arch wire to the condition for receiving a single arch wire, it should be appreciated that it could be used in the reverse order and converted from use for a single wire to use for a doubled back arch wire.

It will be understood that modifications and variations may be effected without departing from the scope of the novel concept of the present invention.

The invention is hereby claimed as follows:

1. A buccal tube assembly convertible for use with doubled back and single form arch wire including a buccal tube having an arch wire opening extending therethrough of substantially oval shape to define opposite end openings of oval cross section and capable of receiving a doubled back arch wire of a size to prevent relative rotation between the arch wire and the tube, and tab means at each end of said tube selectively bendable over the opposite end openings of the tube and coacting therewith to define arch wire receiving end openings of substantially smaller size than said oval end openings to receive an arch wire in single form.

2. A buccal tube assembly as defined in claim 1, wherein said tab means extends mesially and distally from a mounting pad upon which the buccal tube is secured.

3. A buccal tube assembly as defined in claim 1, wherein said tab means is integral with the buccal tube and extends mesially and distally from the lingual wall of the tube.

4. A buccal tube assembly convertible for use with doubled back and single form arch wire including a buccal tube portion defining an oval in cross section arch wire receiving opening having an occlusal-gingival dimension substantially greater than the buccal-lingual dimension and capable of receiving a doubled back portion of an arch wire and means for converting the opening for receiving a single portion of an arch wire by substantially reducing the occlusal-gingival dimension.

5. A buccal tube assembly as defined in claim 4, wherein said converting means includes end ears extending mesially and distally from the mesial and distal ends of said buccal tube portion and being selectively bendable over the mesial and distal ends of said buccal tube portion, said end ears when bent over the ends of said buccal tube portion coacting with said ends of said buccal tube portion and the opening to define arch wire receiving holes having a gingival-occlusal dimension substantially smaller than the gingival-occlusal dimension of said opening.

6. A buccal tube assembly as defined in claim 4, wherein said converting means includes a mounting pad onto which the buccal tube portion is secured, and end ears on said pad extending mesially and distally from the mesial and distal ends of said buccal tube portion selectively bendable over the mesial and distal ends of said buccal tube portion, said end ears when bent over the ends of said buccal tube portion coating with said ends of said buccal tube portion and the opening to define arch wire receiving holes having a gingival-occlusal dimension substantially smaller than the gingival-occlusal dimension of said opening.

7. A buccal tube assembly as defined in claim 4, wherein said converting means includes a mounting pad onto which the buccal tube portion is secured, and end ears on said pad extending mesially and distally from the mesial and distal ends of said buccal tube portion selectively bendable over the mesial and distal ends of said buccal tube portion, and arch wire holes in said end ears adapted to align with said opening when the ears are bent over the ends of the buccal tube portion, said holes having a gingival-occlusal dimension substantially less than the gingival-occlusal dimension of the buccal tube opening.

8. A buccal tube assembly as defined in claim 4, wherein said converting means includes end ears extending mesially and distally from the mesial and distal ends of said buccal tube portion and being selectively bendable over the mesial and distal ends of said buccal tube portion, arch wire receiving holes in said end ears which align with the opening when the ears are bent over the ends of the buccal tube portion to define a buccal tube having a gingival-occlusal dimension substantially smaller than the gingival-occlusal dimension of the opening.

9. A buccal tube assembly as defined in claim 4, wherein said converting means includes a cover member telescopically fitting over said buccal tube portion, and arch wire receiving holes in said cover member aligning with the arch wire receiving opening of said buccal tube portion and having an occlusal-gingival dimension substantially smaller than the occlusal-gingival dimension of said opening.

10. A buccal tube assembly as defined in claim 9, wherein the cover member includes gingival and occlusal walls fitting over the gingival and occlusal walls of the buccal tube position, and mesial and distal walls having said arch wire receiving holes and fitting over the mesial and distal ends of said buccal tube portion.

11. A buccal tube assembly as defined in claim 9, wherein the cover member includes gingival and occlusal walls fitting over the gingival and occlusal walls of the buccal tube position, mesial and distal walls having said arch wire receiving holes and fitting over the mesial and distal ends of said buccal tube portion, and a buccal wall bearing against the buccal side of the buccal tube portion.

12. In combination with an arch wire, a buccal attachment convertible for use with double back and single form arch wire adapted to be mounted buccally of an anchor tooth, said attachment comprising an elongated mesial-distally extending tubular member having an opening extending mesial-distally therethrough with a cross section substantially greater occlusal-gingivally than buccal-lingually, and capable of receiving a doubled back arch wire, and defining opposite end openings of the same cross section, and end ears at opposite ends of said tubular member bendable over the opposite ends of said opening and having a shape to cover a portion of the end openings to coact therewith and define end openings having the same buccal-lingual dimension as the tubular member but having a substantially smaller occlusal-gingival dimension to slidably receive the arch wire in single form.

13. The combination as defined in claim 12, wherein the end ears are integral with the tubular member.

14. The combination as defined in claim 12, wherein the end ears extend from a mounting pad underlying the tubular member.

References Cited

UNITED STATES PATENTS

| | | | |
|---|---|---|---|
| 2,915,824 | 12/1959 | Kesling | 32—14 |
| 2,958,945 | 11/1960 | Waldman | 32—14 |
| 3,391,461 | 7/1968 | Johnson | 32—14 |

ROBERT PESHOCK, Primary Examiner